US012804470B2

(12) United States Patent
Janulewicz et al.

(10) Patent No.: US 12,804,470 B2
(45) Date of Patent: Nov. 17, 2026

(54) GENERALIZED TRAINING FRAMEWORK FOR RESOURCE ALLOCATION IN A NETWORK VIA REINFORCEMENT LEARNING

(71) Applicant: Ciena Corporation, Hanover, MD (US)

(72) Inventors: Emil Janulewicz, Ottawa (CA); Charles Boudreau, Montreal (CA); Brigitte Jaumard, Montreal (CA)

(73) Assignee: Ciena Corporation, Fulton, MD (US)

( * ) Notice: Subject to any disclaimer, the term of this patent is extended or adjusted under 35 U.S.C. 154(b) by 316 days.

(21) Appl. No.: 18/619,421

(22) Filed: Mar. 28, 2024

(65) Prior Publication Data

US 2025/0310834 A1 Oct. 2, 2025

(51) Int. Cl.
*H04W 28/16* (2009.01)
*G06N 3/092* (2023.01)

(52) U.S. Cl.
CPC ............ *H04W 28/16* (2013.01); *G06N 3/092* (2023.01)

(58) Field of Classification Search
CPC ....... H04W 28/16; G06N 3/092; G06N 3/006; G06N 3/02; H04L 47/781; H04L 41/046; H04L 41/145; H04L 41/16; H04L 41/40; H04L 41/0895
USPC ......................................... 370/310, 328, 329
See application file for complete search history.

(56) References Cited

U.S. PATENT DOCUMENTS

2022/0014963 A1* 1/2022 Yeh ................... H04W 28/0268
2022/0327108 A1* 10/2022 Manolache ............ G06N 3/084
2023/0376748 A1* 11/2023 Tian ...................... H04L 41/122
2024/0422063 A1* 12/2024 Somanahalli Krishna Murthy ..... H04L 41/0893
2025/0055764 A1* 2/2025 Outes Carnero ........ G06N 3/09

OTHER PUBLICATIONS

May 13, 2025 International Search Report issued in corresponding PCT Application No. PCT/US2025/015888.
Zhang et al: "Cold-start aware cloud-native service function chain caching in resource-constrained edge: A reinforcement learning approach", Computer Communications, Elsevier Science Publishers BV, Amsterdam, NL, vol. 195, Sep. 10, 2022, pp. 334-345.
(Continued)

*Primary Examiner* — Obaidul Huq
(74) *Attorney, Agent, or Firm* — Clements Bernard Walker; Christopher L. Bernard

(57) ABSTRACT

A generalized training framework for resource allocation in a network including: receiving at an agent a network service request for a network service on the network, the network service request including a service function chain (SFC) representing an ordered set of virtualized/containerized network functions (VNFs/CNFs); and embedding by the agent each of the VNFs/CNFs on a determined node along a determined path of the network in accordance with a reinforcement learning (RL) algorithm executed by the agent and utilizing a generalized graph neural network (GNN) value function, where the generalized GNN value function utilizes a normalized reward function that includes discretized rewards/penalties for multiple steps along the determined path.

20 Claims, 6 Drawing Sheets

(56) References Cited

OTHER PUBLICATIONS

Namjin Seo et al: "Advanced Scaling Methods for VNF deployment with Reinforcement Learning", arxiv.org, Cornell University Library, 201 Olin Library Cornell University Ithaca, NY 14853, Jan. 19, 2023.

Heo Dongnyeong et al: "Reinforcement Learning of Graph Neural Networks for Service Function Chaining in Computer Network Management", 2022 23rd Asia-Pacific Network Operations and Management Symposium {APNOMS), IEICE, Sep. 28, 2022, pp. 1-6.

Tran Thinh Duy et al: "Joint Service Function Chain Embedding and Routing in Cloud-based NFV: A Deep Q-Learning Based Approach", 2021 IEEE 4th 5G World Forum (5GWF), IEEE, Oct. 13, 2021, pp. 171-175.

Liu Yicen et al: "Service Function Chain Embedding Meets Machine Learning: Deep Reinforcement Learning Approach", IEEE Transactions on Network and Service Management, IEEE, vol. 21, No. 3, Jan. 12, 2024, pp. 3465-3481.

* cited by examiner

GENERALIZED TRAINING FRAMEWORK FOR RESOURCE ALLOCATION IN A NETWORK VIA REINFORCEMENT LEARNING

TECHNICAL FIELD

The present disclosure relates generally to networking systems and methods. More particularly, the present disclosure relates to a generalized training framework for resource allocation in a network via reinforcement learning (RL).

BACKGROUND

At various points in a network, an agent may receive a service request from an end user, such as a voice over Internet protocol (VOIP) client, a video streaming client, etc., formulated as a service function chain (SFC) representing an ordered set of virtualized/containerized network functions (VNFs/CNFs) including network functions such as firewalls (FWs), network address translators (NATs), intrusion detection and prevention systems (IDPSs), traffic monitors (TMs), video optimization controllers (VOCs), wide-area network (WAN) optimizers (WOs), etc. Different kinds of SFCs represent different kinds of services that may be requested by the end user. Given a network and a list of incoming service requests formulated as SFCs, paths in the network must be found to connect the end user to the services (or two end users, in the case of a peer-to-peer service), while ensuring that the required VNFs/CNFs are provided as part of the paths in the order specified by the SFCs.

To date, RL has been utilized only as a high-level framework related to autonomous telecommunications networks, without providing specific encoding architectures, reward designs, and/or generalization schemes. Related to SFC embedding, conventional solutions have typically relied on mathematical models executed by the agent, which provide exact solutions, but which have high computational complexity and do not scale well as problem size increases, or heuristic solutions executed by the agent, which are fast and scale much better, but which do not provide exact solutions. Without an intelligent approach, one may necessarily resort to an inefficient, overengineered network to handle unexpected flow surges.

The present background is provided as environmental context only. It will be readily apparent to those of ordinary skill in the art that the principles and concepts of the present disclosure may be implemented in other environmental contexts equally, without limitation.

BRIEF SUMMARY

The present disclosure provides a RL system, method, and non-transitory computer readable medium for efficiently embedding the VNFs/CNFs of a SFC in the nodes along a path of a network when a service request is received by an agent. Again, the agent may receive the service request from an end user, such as a VoIP client, a video streaming client, etc., formulated as the SFC representing the ordered set of VNFs/CNFs including network functions such as FW, NAT, IDPS, TM, VOC, WO, etc. Different kinds of SFCs represent different kinds of services that may be requested by the end user. Thus, given a network and a list of incoming service requests formulated as SFCs, paths in the network may be found to connect the end user to the services (or two end users, in the case of a peer-to-peer service), while ensuring that the required VNFs/CNFs are provided as part of the paths in the order specified by the SFCs.

In accordance with the present solution, the agent receives incoming service requests and begins searching for a path to a destination associated with the first SFC via interaction with the network environment. The agent has a choice to move to a next node in the path while also embedding the current head-of-line (HoL) VNF/CNF on the current node, if supported, or move to the next node in the path without making an embedding decision. If the embedding decision is made, the current HoL VNF/CNF is set to the next one in the SFC, or to none if all the required VNFs/CNFs have been embedded. After each action, the agent checks to see if the requested service has been successfully embedded. If so, the agent moves on to the next service request. Otherwise, the agent observes the new, changed environment and continues the routing exercise. If a delay threshold for a service request has been exceeded, the service request is dropped and the agent moves on to the next service request.

In various embodiments, the deep learning (DL) or RL agent is a deep Q-network (DQN) agent or the like and utilizes a graph neural network (GNN) as a value network. The output of the value network is a matrix representing the value for each possible action at each step of the embedding process. The agent may choose among multiple possible nodes for its next move (including its current location), and for each move, whether or not to embed the current HoL VNF/CNF on its current location prior to the move or not. In this manner, the value network input and reward functions are generalized such that they are not topology dependent, and the reward function is discretized.

This GNN-based RL solution demonstrates superior execution time as compared to exact methods and excellent accuracy as measured by the rate of request acceptance. Further, as a RL solution, it does not need access to the large volumes of annotated training data that a supervised learning (SL) solution would need. The generalized GNN component of the value network of the agent allows the network to be designed such that its input size does not depend on the number of nodes and links in the network, allowing it to continue operating even as the network adds or removes nodes or links from the topology without having to retrain from scratch.

Related to reward definition, splitting the step penalty such that it is not entirely determined by link delay serves to ensure some minimum penalty for a move—enough to discourage undesirable behavior, further discouraged by the addition of an increasing penalty proportional to the number of visits to a given node.

In one embodiment, the present disclosure provides a non-transitory computer readable medium including instructions stored in a memory and executed by a processor to carry out a network resource allocation method including: receiving, at an agent, a network service request for a network service on a network, the network service request including a SFC representing an ordered set of VNFs/CNFs; and embedding, by the agent, each of the VNFs/CNFs on a determined node along a determined path of the network in accordance with a RL algorithm executed by the agent and utilizing a generalized GNN value function, where the generalized GNN value function utilizes a normalized reward function that includes discretized rewards/penalties for multiple steps along the determined path. The agent is located at one of a network controller coupled to the network, a server at a node of the network, an edge router of the network, or a switch of the network. Embedding each of the VNFs/CNFs on the determined node along the determined path of the network includes: at the agent, interacting with a network environment; at the agent, deciding to embed a current HoL VNF/CNF of the SFC on a node of a path if supported by the node; at the agent, deciding to move from the node to a next node of the path based on link bandwidth and latency considerations if the current HoL VNF/CNF of the SFC is not supported by the node; at the agent, proceeding to embed a next HoL VNF/CNF of the SFC on the node or the next node of the path if supported by the node or the next node after the current HoL VNF/CNF is embedded on the node of the path; and, at the agent, completing the network service request if all VNFs/CNFs of the SFC are embedded on the node, the next node, or another node of the path and processing a subsequent network service request. Embedding each of the VNFs/CNFs on the determined node along the determined path of the network further includes, at the agent, dropping the network service request and processing the subsequent network service request if a delay threshold for the network service request is exceeded. The RL algorithm executed by the agent, the generalized GNN value function, and the normalized reward function utilized by the RL algorithm are independent of network size and changes to network topology. The normalized reward function is normalized for link delay such that the normalized reward function is independent of network topology link delay distribution and not dependent upon a raw link delay value of a given network topology. The discretized rewards/penalties are subsets of an overall reward/penalty (R) for the determined path. The discretized rewards/penalties include at least one of: a reward for embedding by the agent of a VNF/CNF on a node of a path; a minimum penalty for a move by the agent from the node to a next node of the path; or an increasing penalty for repeated visits by the agent to the node of the path. The RL algorithm is trained offline using one of a network twin, a network simulator, or a network emulator.

In another embodiment, the present disclosure provides a network resource allocation method including: receiving, at an agent, a network service request for a network service on a network, the network service request including a SFC representing an ordered set of VNFs/CNFs; and embedding, by the agent, each of the VNFs/CNFs on a determined node along a determined path of the network in accordance with a RL algorithm executed by the agent and utilizing a generalized GNN value function, where the generalized GNN value function utilizes a normalized reward function that includes discretized rewards/penalties for multiple steps along the determined path. The agent is located at one of a network controller coupled to the network, a server at a node of the network, an edge router of the network, or a switch of the network. Embedding each of the VNFs/CNFs on the determined node along the determined path of the network includes: at the agent, interacting with a network environment; at the agent, deciding to embed a current HoL VNF/CNF of the SFC on a node of a path if supported by the node; at the agent, deciding to move from the node to a next node of the path based on link bandwidth and latency considerations if the current HOL VNF/CNF of the SFC is not supported by the node; at the agent, proceeding to embed a next HoL VNF/CNF of the SFC on the node or the next node of the path if supported by the node or the next node after the current HoL VNF/CNF is embedded on the node of the path; and, at the agent, completing the network service request if all VNFs/CNFs of the SFC are embedded on the node, the next node, or another node of the path and processing a subsequent network service request. Embedding each of the VNFs/CNFs on the determined node along the determined path of the network further includes, at the agent, dropping the network service request and processing the subsequent network service request if a delay threshold for the network service request is exceeded. The RL algorithm executed by the agent, the generalized GNN value function, and the normalized reward function utilized by the RL algorithm are independent of network size and changes to network topology. The normalized reward function is normalized for link delay such that the normalized reward function is independent of network topology link delay distribution and not dependent upon a raw link delay value of a given network topology. The discretized rewards/penalties are subsets of an overall R for the determined path. The discretized rewards/penalties include at least one of: a reward for embedding by the agent of a VNF/CNF on a node of a path; a minimum penalty for a move by the agent from the node to a next node of the path; or an increasing penalty for repeated visits by the agent to the node of the path. The RL algorithm is trained offline using one of a network twin, a network simulator, or a network emulator.

In a further embodiment, the present disclosure provides a network resource allocation control apparatus including: an agent adapted to receive a network service request for a network service on a network, the network service request including a SFC representing an ordered set of VNFs/CNFs and embed each of the VNFs/CNFs on a determined node along a determined path of the network in accordance with a RL algorithm executed by the agent and utilizing a generalized GNN value function, where the generalized GNN value function utilizes a normalized reward function that includes discretized rewards/penalties for multiple steps along the determined path. The agent is one of a network controller coupled to the network or a non-transitory computer readable medium including instructions stored in a memory and executed by a processor disposed at a server at a node of the network, an edge router of the network, or a switch of the network.

It will be readily apparent to those of ordinary skill in the art that aspects and features of each of the described embodiments may be incorporated, omitted, and/or combined as desired in a given application, without limitation.

BRIEF DESCRIPTION OF THE DRAWINGS

The present disclosure is illustrated and described with reference to the various drawings, in which like reference numbers are used to denote like system components/method steps, as appropriate, and in which.

It will be readily apparent to those of ordinary skill in the art that aspects and features of each of the illustrated embodiments may be incorporated, omitted, and/or combined as desired in a given application, without limitation.

DETAILED DESCRIPTION

Figure 1:
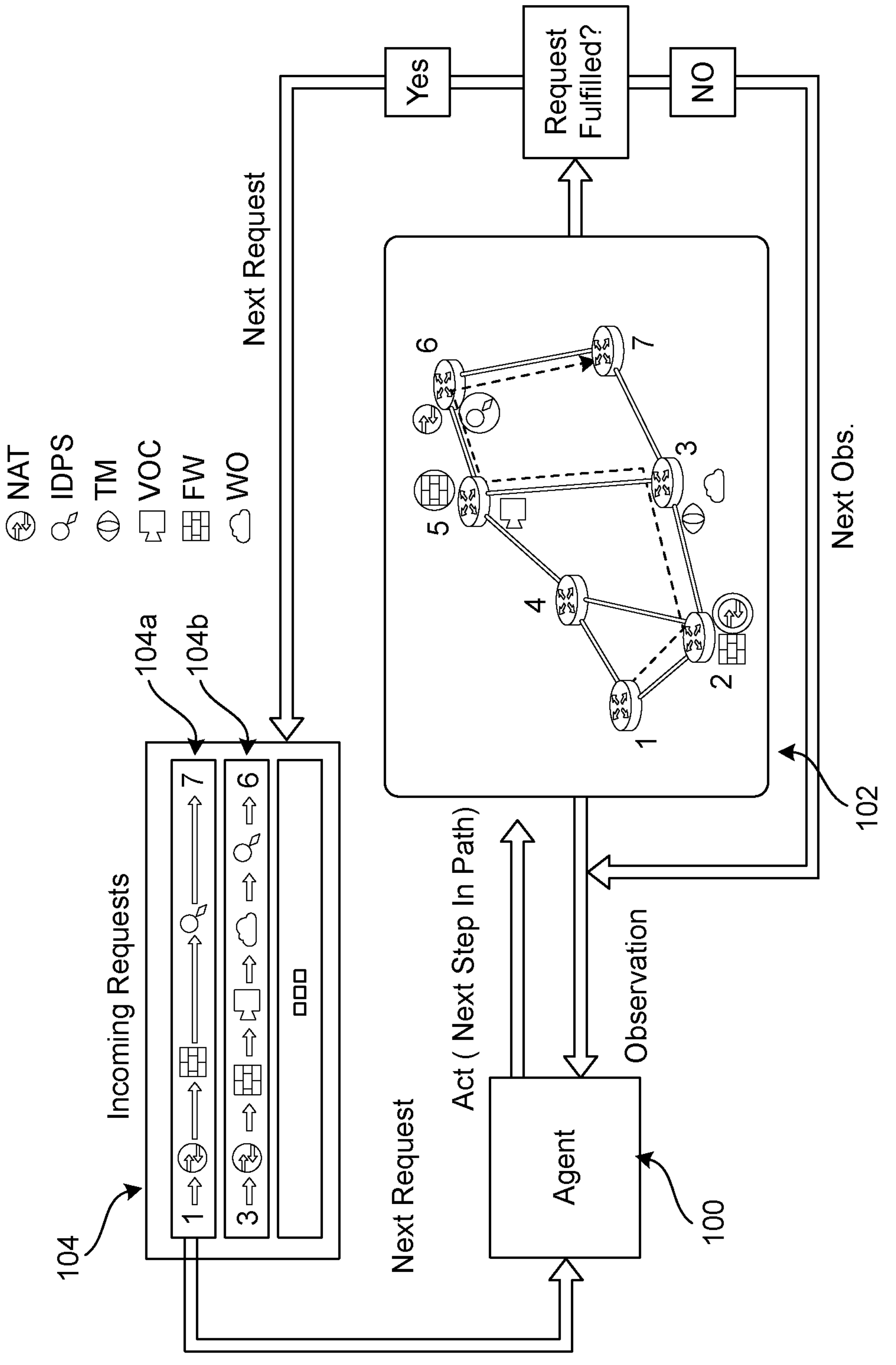
FIG. 1 is a schematic diagram illustrating one embodiment of the RL SFC embedding system and process flow of the present disclosure.

Referring to FIG. 1, the agent 100, which may be implemented in hardware or as a non-transitory computer readable medium stored in a memory and executed by a processor at a network controller coupled to a network 102, a node of the network 102, an edge router or switch of the network 102, etc., receives incoming service requests 104 and begins searching for a path to a destination associated with the first SFC 104*a* via interaction with the network environment. The agent 100 has a choice to move to a next node in the path while also embedding the current HoL VNF/CNF on the current node, if supported, or move to the next node in the path without making an embedding decision. If the embedding decision is made, the current HoL VNF/CNF is set to the next one in the SFC 104*a*, or to none if all the required VNFs/CNFs have been embedded. After each action, the agent 100 checks to see if the requested service has been successfully embedded. If so, the agent 100 moves on to the next service request and the second SFC 104*b*. Otherwise, the agent 100 observes the new, changed environment and continues the routing exercise. If a delay threshold for a service request has been exceeded, the service request is dropped and the agent moves on to the next service request.

Figure 2:
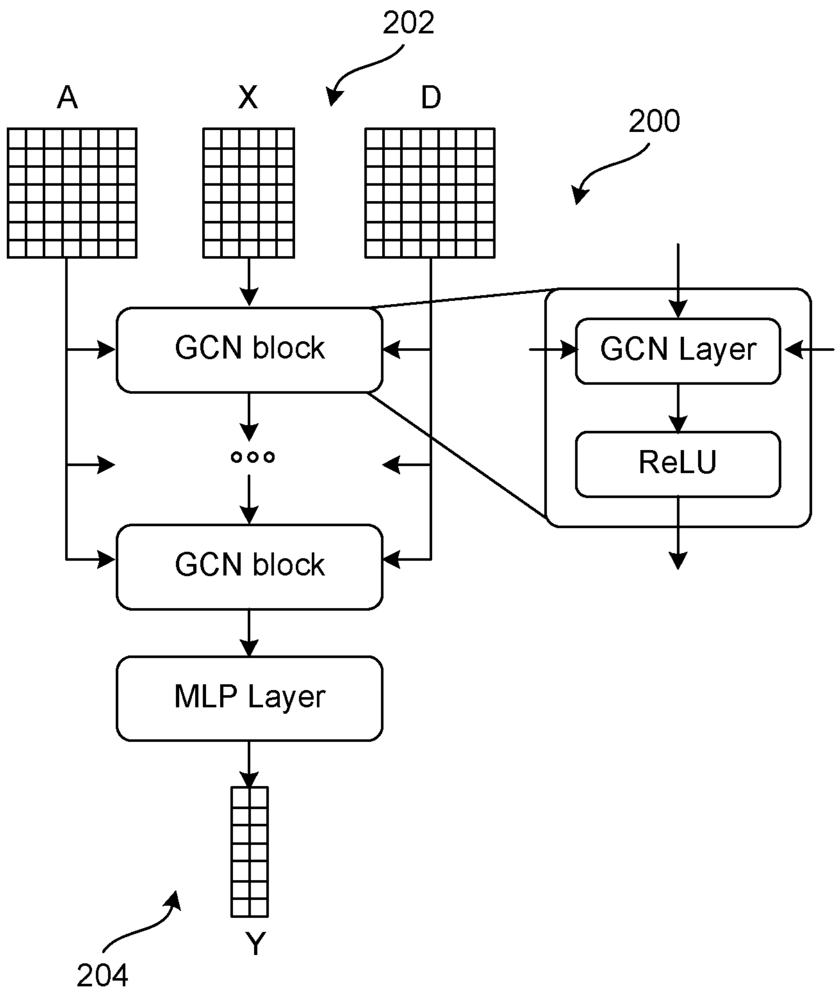
FIG. 2 is a schematic diagram illustrating one embodiment of the GNN value network of the present disclosure.

Referring to FIG. 2, the DL or RL agent 100 is a DQN agent or the like and utilizes a GNN as a value network 200. The agent 100 is trained offline on a network twin or via a network simulator or emulator, but may also be trained online with the live network 102. The input (A, X, D) 202 for the network 102 is divided into three separate matrices: the feature matrix, X, is a $N \times F_v$ matrix, where N is the number of nodes in the topology and $F_v$ is the number of feature columns for the vertices; the adjacency matrix, A, is a $N \times N$ matrix that represents the connectivity of the graph, and the edge feature matrix, D, is a $N \times N \times F_e$ matrix, where $F_e$ represents the number of edge features. The output (Y) 204 of the value network 200 is a $N \times 2$ matrix representing the value for each possible action at each step of the embedding process. The agent 100 may choose among N possible nodes for its next move (including its current location), and for each move, whether or not to embed the current HoL VNF/CNF onto its current location prior to the move or not. The details of the operation of a GNN in general are well known to those of ordinary skill in the art and are not described in further detail.

In general, the agent 100 of the present disclosure utilizing the GNN value network 200 means that the VNFs/CNFs of a given SFC may be efficiently embedded (or not) in order in the nodes along a path in the network 102 based on the capabilities and limitations of the associated servers and taking into account the bandwidth and latency of the associated links. Because the GNN value network is utilized, the inputs 202 can be generalized, and the rewards can be normalized. With rewards discretized per step, the agent 100 is able to deal with topologies of any scale and the model does not have to be retrained as the network 102 changes over time. Thus, at its core, the GNN is the neural network (NN) used by the RL agent 100 as GNNs are optimized to treat generic graph data. GNNs are designed to exploit the geometric properties of graphs in a manner similar to how convolutional neural networks (CNNs) exploit the grid-like nature of images, which has led to a revolution in the processing of image data.

A GNN is defined by an operation known as neural message-passing, where the nodes exchange information through aggregating messages from immediate neighbors, and then using these messages to update individual representations. GNNs perform several rounds of message-passing, each successive round increasing the receptive field of the nodes and allowing each node to craft a more detailed representation of its neighborhood. The GNN operations can be expressed through the following for the message-passing embedding or embedding update, h, corresponding to each node, u:

$$h_u^{(k+1)} = \sigma^{(k)}\left(h_u^{(k)}, \psi^{(k)}\left(\{h_v^{(k)}, v \in \mathcal{N}(u)\}\right)\right) = \sigma^{(k)}\left(h_u^{(k)}, m_{\mathcal{N}(u)}^{(k)}\right), \quad (1)$$

where σ (update) and ψ (aggregate) can be any differentiable function for each message-passing embedding or embedding update, h, such as a neural network. For each message-passing embedding or embedding update, h, a message, m, is created for each node by aggregating the embeddings from the neighborhood of the node, $\mathcal{N}$, and this message, m, is then used to update the node embedding of the central node. Superscripts and subscripts are used to distinguish the embeddings and functions at different iterations of the message passing.

As an example, during implementation and experimentation, the present disclosure uses several graph convolutional network (GCN) layers fed into an activation function (e.g., a rectified linear unit (ReLU) activation function) to form GCN blocks, followed by a fully connected layer (e.g., an MLP layer) to output Y, a $N \times 2$ matrix representing the value of each possible action for a given step. The GCN layer is a simple yet effective GNN type that has seen widespread use.

The exact implementation of the GNN is highly customizable. There exist today many different ways to implement this scheme, from the relatively simple but widely used GCN to more elaborate schemes such as a graph attention network (GAT) that uses a self-attention scheme similar to that found in the nowadays ubiquitous transformer model.

The GNN-based solution offers several advantages over an equivalent MLP solution, including the ability to retain the use of the model on a topology that experiences sudden changes such as the addition and removal of nodes (whereas the MLP where input size is determined by the topology would be rendered unusable), and the ability to reach convergence with a reduced amount of data, leading to improved scalability as the network size increases.

Figure 3:
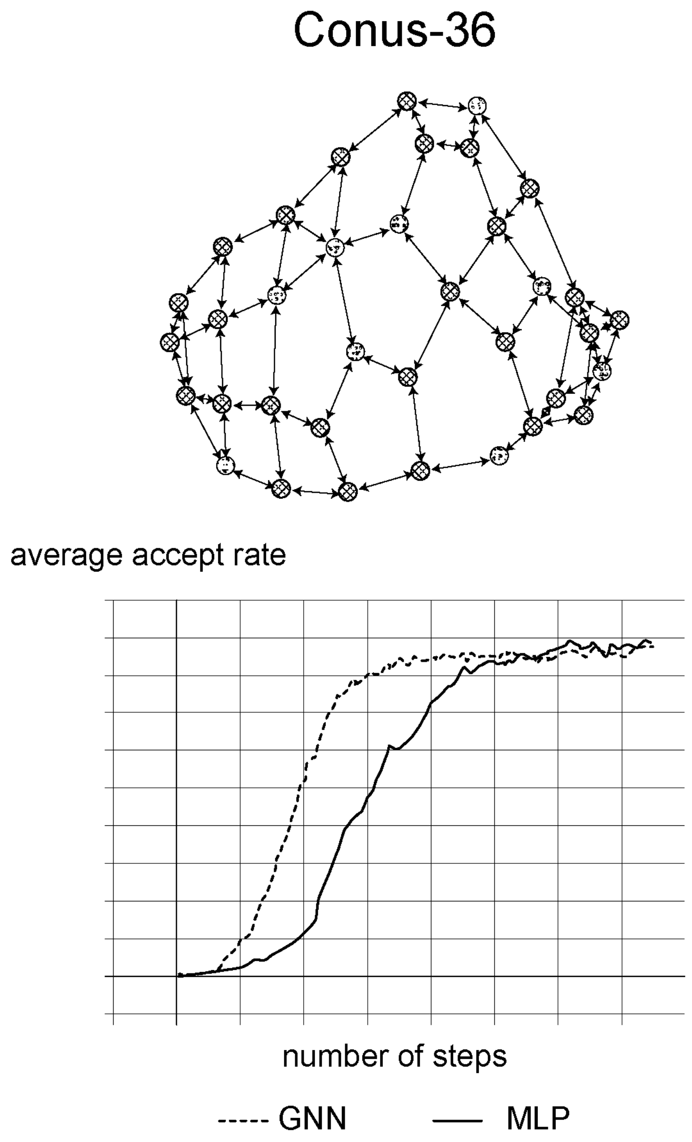
FIG. 3 illustrates an example network topology with 36 nodes, as well as training results of the solution of the present disclosure as compared to a RL agent that uses a typical fully-connected or multi-layer perceptron (MLP) network as its value network.
Figure 4:
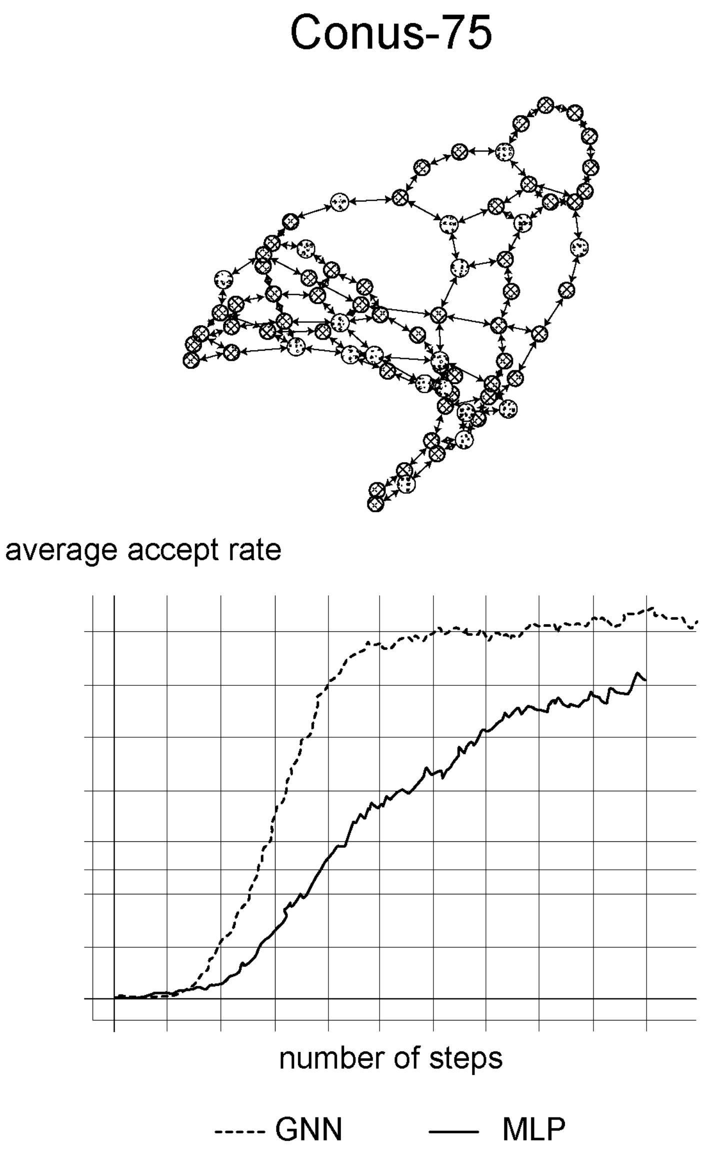
FIG. 4 illustrates an example network topology with 75 nodes, as well as training results of the solution of the present disclosure as compared to a RL agent that uses a typical fully-connected or MLP network as its value network.

FIGS. 3 and 4 provide two illustrative network topologies with 36 and 75 nodes, respectively, as well as the training results of the solution of the present disclosure as compared to a RL agent that uses a typical fully-connected or MLP network as its value network. The GNN solution requires roughly the same number of steps to converge for both networks, whereas the MLP solution requires more time to converge as the size of the network increases. This also means that, even if the MLP solution's input size were not dependent on the topology and it could be used on altered topologies, the GNN would retain an advantage in that it would require less data in order to adjust to the new topology.

The design of the reward function is also revised in order to address some issues that occur upon switching from one network topology to another. The values of the link delays are normalized such that when moving from one topology with a given link delay distribution to another topology featuring a different link delay distribution, the agent 100 performs in a comparable manner, as the value of the penalties given for a move are not dependent on the raw link delay values. The important aspect of the reward function, however specifically formulated, is that it is not topology dependent, but rather may be used for different topologies as rewards are broken down into steps and not tailored to overall path performance. The reward is thus elaborated as follows:

$$r^i_{v_1,v_2} = \begin{cases} -\Lambda_{LINK} - \Lambda_{visit} \\ R\cdot\zeta_0 - \Lambda_{LINK} - \Lambda_{VNF} - \Lambda_{visit} \\ R - R\cdot\zeta_5\cdot\delta^{ACC} \\ -R \end{cases} \tag{2}$$

where $$\Lambda_{LINK} = R\cdot\zeta_1 + R\cdot\zeta_2\cdot NORM(\delta^{LINK}) \tag{3}$$

$$\Lambda_{VNF} = R\cdot\zeta_3\cdot NORM(\delta^{VNF})$$

$$\Lambda_{visit} = R\cdot\zeta_4\cdot\psi_{v_2}.$$

Thus, the terms of the reward are defined as follows:

$$r^i_{v_1,v_2}:$$

Reward obtained at step i of the embedding process for the current request, for a move from node $v_1$ to $v_2$.

R: Main Reward granted upon successful embedding of the request.

$\zeta_{0-5}$: Term of value between 0 and 1 associated with various intermediate rewards and penalties. Intended to be combined with R such that these intermediate rewards scale with the main reward.
- 0: VNF embedding reward
- 1: Step penalty, fixed
- 2: Step penalty, link-delay dependent
- 3: VNF processing delay penalty
- 4: Visit Penalty.
- 5: Penalty for accumulated delay at end of embedding process $\delta^{LINK}$: Delay value for a given link in the topology (could also be written as $$\delta^{LINK}_{v_1,v_2}).$$

$\delta^{VNF}$: Processing delay for a given VNF type (could also be written as $$\delta^{VNF}_f,$$

where f is the current head-of-line).

$\delta^{ACC}$: Accumulated delay for the current request (link and VNF processing).

$\psi_v$: Visit counter for a node v, increments with each visit to v.

$\Lambda_{visit}$: Visit penalty, meant to discourage multiple visits to the same node during request embedding (resets for every new request).

Here, $\Lambda_{link}$ is a penalty term applied for each move, a fraction of which is fixed ($R\cdot\zeta_1$), and the other part is proportional to the normalized value of the link delay. $\Lambda_{vnf}$ is a penalty for the VNF/CNF delay. NORM( ) refers to a normalization scheme for the link delays, such that the values lie between 0 and 1. For this particular case, a tanh normalization is chosen, but other normalization schemes can be utilized.

$$NORM(x) = 0.5\left(\tanh\left(\frac{x-\mu}{\sigma}\right)+1\right) \tag{4}$$

where μ and σ represent the mean and standard deviation for the link delays in the topology.

In addition, the reward function of the present disclosure ensures that all small rewards and penalties are derived as a percentage of the large R, and are not each arbitrary values as is typical, with the intention of ensuring that this reward function retains its effectiveness as graphs change, and that the values would not be over-tuned for a specific graph.

Thus, the present disclosure provides single state encoding and reward design that can be used for arbitrary network topologies and resource/link distributions. Furthermore, during inference, the single state encoding allows for changes in the network initially trained on via node/link addition/removal. The GNN-based RL solution accounts for VNF/CNF resource consumption (central processing unit (CPU), random access memory (RAM), storage, etc.), bandwidth, and the delay threshold of requests. The design of the reward function addresses the potentially sparse nature of existing rewards and ensures effectiveness with changing link delay distributions. The penalty for each new step is split into fixed and delay dependent parts to ensure that the agent is properly penalized even if link delay is extremely low. The visit penalty discourages multiple visits to the same node, allowing the agent to avoid getting stuck in a loop. Normalizing the link delay values ensures similar performance when dealing with networks featuring significantly different link delay distributions.

To date, RL has been utilized only as a high-level framework related to autonomous telecommunications networks, without providing specific encoding architectures, reward designs, and/or generalization schemes. Related to SFC embedding, conventional solutions have typically relied on mathematical models executed by the agent, which provide exact solutions, but which have high computational complexity and do not scale well as problem size increases, or heuristic solutions executed by the agent, which are fast and scale much better, but which do not provide exact solutions. Without an intelligent approach, one may necessarily resort to an inefficient, overengineered network to handle unexpected flow surges.

DL solutions, both supervised and reinforcement, typically design the input to the network such that it is dependent on the size of the topology being treated. In the event that this topology changes (i.e., nodes or links are added or removed), the model must be retrained from scratch, as the input dimension will have changed, rendering the model unusable. Furthermore, a typical, fully-connected DL model will need an increasing amount of data in order to reach convergence in terms of the number of accepted requests, which increases along with the size (in number of nodes) of the network it operates on.

Existing GNN solutions, at most deal with a simplified formulation of the problem of the present disclosure, where either there are no SFCs to deal with (i.e. simple routing problems) or the VNFs/CNFs do not need to mind resource consumption. These solutions are also only tested on much smaller topologies than we have, and so the scaling capabilities are not considered.

Reward schemes where agents are penalized based on link delay are not suitable for topologies where link delay values could vary greatly. An agent using this scheme could get stuck going through the same link until termination, simply because this behavior would incur a very weak step penalty due to the small delay of that particular link. Most schemes only grant a reward upon completion of the main objective (i.e., a successful routing), and while this is the most orthodox approach to reward design, on large topologies that may have long potential paths, the reward would be very sparse, leading to long training times.

Some existing reward structures use a non-normalized delay value, leaving the scheme vulnerable to shifts in the distribution of the delay values in the topology used. A link with an extremely low delay value might be overvalued by the agent, which could then go through it again and again due to the low penalty. The reward has no way to counter this undesirable behavior, should it arise.

The GNN-based RL solution of the present disclosure demonstrates execution times superior to exact mathematical models and associated existing methods and excellent accuracy (as measured by the rate of request acceptance). As a RL solution, it does not need access to large volumes of training data that a supervised learning solution would need.

The GNN component of the value network of the agent allows the network to be designed such that its input size does not depend on the number of nodes and links in the network, allowing it to continue operating even as the network adds or removes nodes and links from the topology without having to re train from scratch. The GNN also needs less data to be completely trained as compared to a MLP solution, an advantage in fields where training data may be hard to come by. This also means that the system needs to learn from less data to readjust itself if the distribution of training data or the topology were to change during the exercise.

As compared to other GNN solutions, this solution takes into account computing resource demands for the VNFs/CNFs in the SFCs, in addition to minding bandwidth constraints and a delay threshold for each request. Concerning the reward definition, splitting the step penalty such that it is not entirely determined by link delay serves to ensure some minimum penalty for a move, enough to discourage undesirable behavior. This is further discouraged by the addition of an increasing penalty proportional to the number of visits to a given node.

Figure 5:
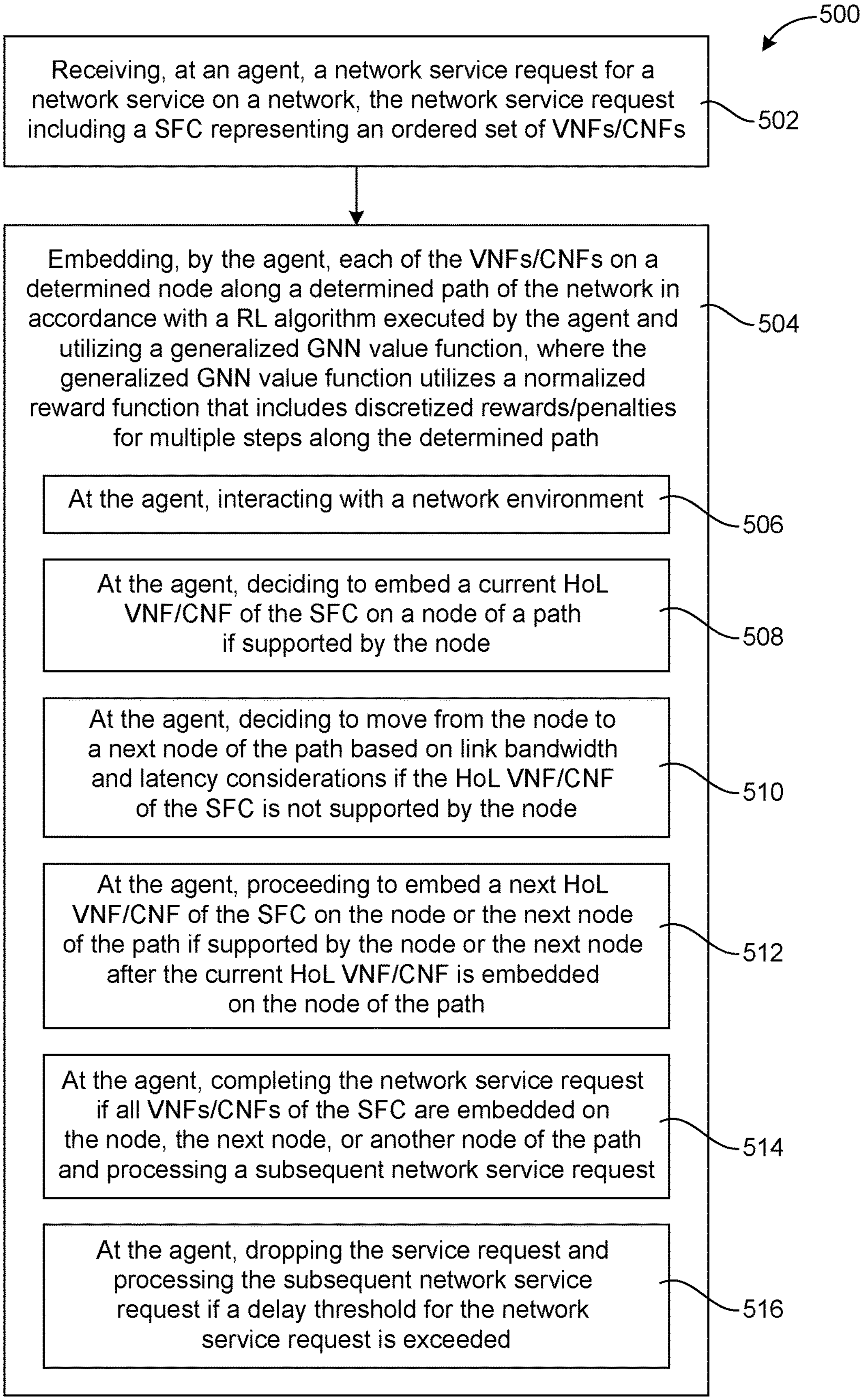
FIG. 5 is a flowchart illustrating one embodiment of the RL SFC embedding method of the present disclosure.

FIG. 5 illustrates one embodiment of the network resource allocation method 500 of the present disclosure, which includes: receiving at an agent a network service request for a network service on a network 502, the network service request including a SFC representing an ordered set of VNFs/CNFs; and embedding by the agent each of the VNFs/CNFs on a determined node along a determined path of the network in accordance with a RL algorithm executed by the agent and utilizing a generalized GNN value function 504, where the generalized GNN value function utilizes a normalized reward function that includes discretized rewards/penalties for multiple steps along the determined path. The agent is located at one of a network controller coupled to the network, a server at a node of the network, an edge router of the network, or a switch of the network. Embedding each of the VNFs/CNFs on the determined node along the determined path of the network 504 includes: at the agent interacting with a network environment 506; at the agent deciding to embed a current HoL VNF/CNF of the SFC on a node of a path if supported by the node 508; at the agent deciding to move from the node to a next node of the path based on link bandwidth and latency considerations if the HoL VNF/CNF of the SFC is not supported by the node 510; at the agent proceeding to embed a next HoL VNF/CNF of the SFC on the node or the next node of the path if supported by the node or the next node after the current HoL VNF/CNF is embedded on the node of the path 512; and at the agent completing the network service request if all VNFs/CNFs of the SFC are embedded on the node, the next node, or another node of the path and processing a subsequent network service request 514. Embedding each of the VNFs/CNFs on the determined node along the determined path of the network 504 further includes at the agent dropping the service request and processing the subsequent network service request if a delay threshold for the network service request is exceeded 516. The RL algorithm executed by the agent and the generalized GNN value function and the normalized reward function utilized by the RL algorithm are independent of network size and changes to network topology. The normalized reward function is normalized for link delay such that the normalized reward function is independent of network topology link delay distribution and not dependent upon a raw link delay value of a given network topology. The discretized rewards/penalties are subsets of an overall R for the determined path. The discretized rewards/penalties include at least one of: a reward for embedding by the agent of a VNF/CNF on a node of a path; a minimum penalty for a move by the agent from the node to a next node of the path; or an increasing penalty for repeated visits by the agent to the node of the path. The RL algorithm is trained offline using one of a network twin, a network simulator, or a network emulator.

Figure 6:
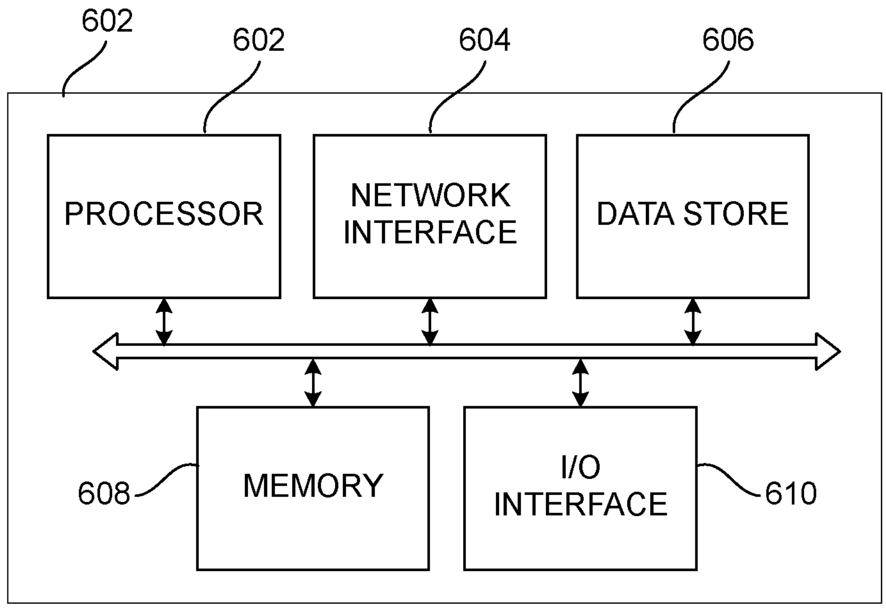
FIG. 6 is a block diagram of an example processing device used in conjunction with the RL SFC embedding system and process flow of the present disclosure.

Referring to FIG. 6, it will be appreciated that some embodiments of the agent processing device/system 600 described may include one or more generic or specialized processors 602 ("one or more processors") such as microprocessors; CPUs; digital signal processors (DSPs); customized processors such as network processors (NPs) or network processing units (NPUs), graphics processing units (GPUs), or the like; field programmable gate arrays (FPGAs); and/or the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic or circuitry. Of course, a combination of the aforementioned approaches may be used. For some of the embodiments described, a corresponding device in hardware and optionally with software, firmware, and/or a combination thereof can be referred to as "circuitry configured or adapted to," "logic configured or adapted to," etc. perform a set of operations, steps, methods, processes, algorithms, functions, techniques, etc. on digital and/or analog signals as described for the various embodiments.

Moreover, some embodiments may include a non-transitory computer readable medium having computer readable code or instructions stored thereon for programming a computer, server, appliance, device, processor, circuit, etc. each of which may include the processor 602 to perform functions as described and claimed. Examples of such computer-readable media include, but are not limited to, a hard disk, an optical storage device, a magnetic storage device, a read only memory (ROM), a programmable read only memory (PROM), an erasable programmable read only memory (EPROM), an electrically erasable programmable read only memory (EEPROM), flash memory, and/or the like. When stored in the non-transitory computer readable medium, software can include instructions executable by the processor or device 602 (e.g., any type of programmable circuitry or logic) that, in response to such execution, cause a processor or the device to perform a set of operations, steps, methods, processes, algorithms, functions, techniques, etc. as described for the various embodiments.

The agent processing device/system 600 can include the processor 602 which is a hardware device for executing software instructions. The processor 602 can be any custom made or commercially available processor, a CPU, an auxiliary processor among several processors associated with the agent processing device/system 600, a semiconductor-based microprocessor (in the form of a microchip or chipset), or generally any device for executing software instructions. When the agent processing device/system 600 is in operation, the processor 602 is configured to execute software stored within the memory 608, to communicate data to and from the memory 608, and to generally control operations of the agent processing device/system 600 pursuant to the software instructions. The agent processing device/system 600 can also include a network interface 604, a data store 606, the memory 608, an input/output (I/O) interface 610, and the like, all of which are communicatively coupled to one another and to the processor 602.

The network interface 604 can be used to enable the agent processing device/system 600 to communicate on a data communication network, such as to communicate to a management system and the like. The network interface 604 can include, for example, an Ethernet module. The network interface 604 can include address, control, and/or data connections to enable appropriate communications on the network. The data store 606 can be used to store data, such as control plane information, provisioning data, Operations, Administration, Maintenance, and Provisioning (OAM&P) data, etc. The data store 606 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 606 can incorporate electronic, magnetic, optical, and/or other types of storage media. The memory 608 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 608 may incorporate electronic, magnetic, optical, and/or other types of storage media. Note that the memory 608 can have a distributed architecture, where various components are situated remotely from one another, but may be accessed by the processor 602. The I/O interface 610 includes components for the agent processing device/system 600 to communicate with other devices.

Although the present disclosure is illustrated and described with reference to specific embodiments and examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A non-transitory computer readable medium comprising instructions stored in a memory and executed by a processor to carry out a network resource allocation method comprising:

receiving, at an agent, a network service request for a network service on a network, the network service request comprising a service function chain (SFC) representing an ordered set of virtualized/containerized network functions (VNFs/CNFs); and embedding, by the agent, each of the VNFs/CNFs on a determined node along a determined path of the network in accordance with a reinforcement learning (RL) algorithm executed by the agent and utilizing a generalized graph neural network (GNN) value function, wherein the generalized GNN value function utilizes a normalized reward function that comprises discretized rewards/penalties for multiple steps along the determined path, and wherein embedding each of the VNFs/CNFs on the determined node along the determined path of the network comprises, at the agent, interacting with a network environment, deciding to embed a current head-of-line (HoL) VNF/CNF of the SFC on a node of a path if supported by the node, and deciding to move from the node to a next node of the path based on link bandwidth and latency considerations if the current HoL VNF/CNF of the SFC is not supported by the node.

2. The non-transitory computer readable medium of claim 1, wherein the agent is located at one of a network controller coupled to the network, a server at a node of the network, an edge router of the network, or a switch of the network.

3. The non-transitory computer readable medium of claim 1, wherein embedding each of the VNFs/CNFs on the determined node along the determined path of the network further comprises:

at the agent, proceeding to embed a next HoL VNF/CNF of the SFC on the node or the next node of the path if supported by the node or the next node after the current HOL VNF/CNF is embedded on the node of the path; and at the agent, completing the network service request if all VNFs/CNFs of the SFC are embedded on the node, the next node, or another node of the path and processing a subsequent network service request.

4. The non-transitory computer readable medium of claim 3, wherein embedding each of the VNFs/CNFs on the determined node along the determined path of the network further comprises:

at the agent, dropping the network service request and processing the subsequent network service request if a delay threshold for the network service request is exceeded.

5. The non-transitory computer readable medium of claim 1, wherein the RL algorithm executed by the agent, the generalized GNN value function, and the normalized reward function utilized by the RL algorithm are independent of network size and changes to network topology.

6. The non-transitory computer readable medium of claim 1, wherein the normalized reward function is normalized for link delay such that the normalized reward function is independent of network topology link delay distribution.

7. The non-transitory computer readable medium of claim 1, wherein the discretized rewards/penalties are subsets of an overall reward/penalty (R) for the determined path.

8. The non-transitory computer readable medium of claim 1, wherein the discretized rewards/penalties comprise at least one of:

a reward for embedding by the agent of a VNF/CNF on a node of a path;

a minimum penalty for a move by the agent from the node to a next node of the path; or an increasing penalty for repeated visits by the agent to the node of the path.

9. The non-transitory computer readable medium of claim 1, wherein the RL algorithm is trained offline using one of a network twin, a network simulator, or a network emulator.

10. A network resource allocation method comprising:

receiving, at an agent, a network service request for a network service on a network, the network service request comprising a service function chain (SFC) representing an ordered set of virtualized/containerized network functions (VNFs/CNFs); and embedding, by the agent, each of the VNFs/CNFs on a determined node along a determined path of the network in accordance with a reinforcement learning (RL) algorithm executed by the agent and utilizing a generalized graph neural network (GNN) value function, wherein the generalized GNN value function utilizes a normalized reward function that comprises discretized rewards/penalties for multiple steps along the determined path, and wherein embedding each of the VNFs/CNFs on the determined node along the determined path of the network comprises, at the agent, interacting with a network environment, deciding to embed a current head-of-line (HoL) VNF/CNF of the SFC on a node of a path if supported by the node, and deciding to move from the node to a next node of the path based on link bandwidth and latency considerations if the current HoL VNF/CNF of the SFC is not supported by the node.

11. The network resource allocation method of claim 10, wherein the agent is located at one of a network controller coupled to the network, a server at a node of the network, an edge router of the network, or a switch of the network.

12. The network resource allocation method of claim 10, wherein embedding each of the VNFs/CNFs on the determined node along the determined path of the network further comprises:

at the agent, proceeding to embed a next HoL VNF/CNF of the SFC on the node or the next node of the path if supported by the node or the next node after the current HOL VNF/CNF is embedded on the node of the path; and at the agent, completing the network service request if all VNFs/CNFs of the SFC are embedded on the node, the next node, or another node of the path and processing a subsequent network service request.

13. The network resource allocation method of claim 12, wherein embedding each of the VNFs/CNFs on the determined node along the determined path of the network further comprises:

at the agent dropping the network service request and processing the subsequent network service request if a delay threshold for the network service request is exceeded.

14. The network resource allocation method of claim 10, wherein the RL algorithm executed by the agent, the generalized GNN value function, and the normalized reward function utilized by the RL algorithm are independent of network size and changes to network topology.

15. The network resource allocation method of claim 10, wherein the normalized reward function is normalized for link delay such that the normalized reward function is independent of network topology link delay distribution.

16. The network resource allocation method of claim 10, wherein the discretized rewards/penalties are subsets of an overall reward/penalty (R) for the determined path.

17. The network resource allocation method of claim 10, wherein the discretized rewards/penalties comprise at least one of:

a reward for embedding by the agent of a VNF/CNF on a node of a path;

a minimum penalty for a move by the agent from the node to a next node of the path; or an increasing penalty for repeated visits by the agent to the node of the path.

18. The network resource allocation method of claim 10, wherein the RL algorithm is trained offline using one of a network twin, a network simulator, or a network emulator.

19. A network resource allocation control apparatus comprising:

an agent adapted to:

receive a network service request for a network service on a network, the network service request comprising a service function chain (SFC) representing an ordered set of virtualized/containerized network functions (VNFs/CNFs); and embed each of the VNFs/CNFs on a determined node along a determined path of the network in accordance with a reinforcement learning (RL) algorithm executed by the agent and utilizing a generalized graph neural network (GNN) value function, wherein the generalized GNN value function utilizes a normalized reward function that comprises discretized rewards/penalties for multiple steps along the determined path, wherein the normalized reward function incorporates a fixed step penalty, a delay penalty, and a repeated visit penalty.

20. The network resource allocation control apparatus of claim 19, wherein the agent is one of a network controller coupled to the network or a non-transitory computer readable medium comprising instructions stored in a memory and executed by a processor disposed at a server at a node of the network, an edge router of the network, or a switch of the network.

* * * * *